US012508500B2

(12) United States Patent
Lin

(10) Patent No.: US 12,508,500 B2
(45) Date of Patent: Dec. 30, 2025

(54) MULTI-PLAYER CLAW MACHINE

(71) Applicant: FA TENG TECHNOLOGY CO., LTD., Taichung (TW)

(72) Inventor: Shau-Yu Lin, Taichung (TW)

(73) Assignee: FA TENG TECHNOLOGY CO., LTD., Taichung (TW)

( * ) Notice: Subject to any disclaimer, the term of this patent is extended or adjusted under 35 U.S.C. 154(b) by 51 days.

(21) Appl. No.: 18/610,189

(22) Filed: Mar. 19, 2024

(65) Prior Publication Data

US 2025/0295985 A1 Sep. 25, 2025

(51) Int. Cl.
*A63F 9/30* (2006.01)
*G07F 17/32* (2006.01)

(52) U.S. Cl.
CPC ............ *A63F 9/30* (2013.01); *G07F 17/3297* (2013.01)

(58) Field of Classification Search
None
See application file for complete search history.

(56) References Cited

U.S. PATENT DOCUMENTS 7,080,840 B1 * 7/2006 Chen .......................... A63F 9/30 273/447
9,526,978 B1 * 12/2016 Shoemaker, Jr. ... G07F 17/3251
2024/0233494 A1 * 7/2024 Dimatteo, III ........ G07F 17/323
2025/0090942 A1 * 3/2025 Wei ........................... A63F 9/30

FOREIGN PATENT DOCUMENTS

JP 2020110495 A * 7/2020

OTHER PUBLICATIONS

English translation of JP-2020110495-A provided by IP.com (Year: 2020).*

* cited by examiner

*Primary Examiner* — Seng H Lim
(74) *Attorney, Agent, or Firm* — Che-Yang Chen

(57) ABSTRACT

A multi-player claw machine includes a coin slot, a first controller, a second controller, a third controller, and a fourth controller. The first controller has a first joystick configured to actuate a first claw unit. The second controller has a second joystick configured to actuate a second claw unit. The third controller has a third joystick configured to actuate a third claw unit. The fourth controller has a fourth joystick configured to actuate a fourth claw unit. The coin slot is connected to a coin acceptor. The coin acceptor is able to generate a playable value. Any one of the first controller, the second controller, the third controller and the fourth controller can be actuated to play a game.

3 Claims, 4 Drawing Sheets

MULTI-PLAYER CLAW MACHINE

BACKGROUND OF THE PRESENT INVENTION

Field of Invention

The present invention relates to a claw machine, and more particularly to a multi-player claw machine which provides a game for players to catch articles (prizes). The claw machine has a coin slot for players to put coins into the coin slot, and the coin value can be computed. The claw machine has a first controller, a second controller, a third controller and a fourth controller each corresponding in position to a prize space inside the claw machine and having a joystick. The player can move the joystick to manipulate a claw unit provided in the corresponding prize space to catch an article (prize). The claw machine may be operated by many players at the same time.

Description of Related Arts

A conventional multi-layer claw machine 10, as shown in FIG. 1, comprises a housing 11, four coin slots 12, a first controller 13, a second controller 14, a first claw unit 15, a second claw unit 16, a third claw unit 17, and a fourth claw unit 18. A plurality of partitions 111 are disposed inside the housing 11, so that the housing 11 is partitioned into a first prize space 112, a second prize space 113, a third prize space 114 and a fourth prize space 115 that are arranged side by side on the top, bottom, left and right sides of the housing 11. A first chute 116 is disposed between the first prize space 112 and the second prize space 113, so that the first prize space 112 communicates with the second prize space 113. A second chute 117 is disposed between the third prize space 114 and the fourth prize space 115, so that the third prize space 114 communicates with the fourth prize space 115. The first chute 116 is located directly above a first prize outlet 118. The second chute 117 is located directly above a second prize outlet 119. The four coin slots 12 are arranged on the lower section of the front of the housing 11, defined as a first con slot 121, a second coin slot 122, a third coin slot 123 and a fourth coin slot 124. As shown in the figure, the coin slots are arranged in the same manner as the prize spaces, corresponding to the first prize space 112, the second prize space 113, the third prize space 114 and the fourth prize space 115. The player can understand the control object of the operation from the arrangement. The first coin slot 121, the second coin slot 122, the third coin slot 123 and the fourth coin slot 124 are each connected to a coin acceptor 19. The coin acceptor 19 can calculate the coin value and the number of games that can be played. The first controller 13 is electrically connected to the coin acceptor 19 of the first coin slot 121 and the coin acceptor 19 of the second coin slot 122. The second controller 14 is electrically connected to the coin acceptor 19 of the third coin slot 123 and the coin acceptor 19 of the fourth coin slot 124. The first claw unit 15 is electrically connected to the first controller 13. After the player puts coins into the first coin slot 121, the player can manipulate the first controller 13 to control the movement and action of the first claw unit 15 for catching an article (prize). The second claw unit 16 is also electrically connected to the first controller 13. After the player puts coins into the second coin slot 122, the player can manipulate the second controller 13 to control the movement and action of the second claw unit 16 for catching an article (prize). The third claw unit 17 is electrically connected to the second controller 14. After the player puts coins into the third coin slot 123, the player can manipulate the second controller 14 to control the movement and action of the third claw unit 17 for catching an article (prize). The fourth claw unit 18 is also electrically connected to the second controller 14. After the player puts coins into the fourth coin slot 124, the player can manipulate the fourth controller 14 to control the movement and action of the fourth claw unit 18 for catching an article (prize). The first controller 13 can only select the first claw unit 15 or the second claw unit 16 for operation at a time. Similarly, the second controller 14 can only select the third claw unit 17 or the fourth claw unit 18 for operation at a time. However, the players may operate the first controller 13 and the second controller 14 at the same time or not at the same time. When the player uses the claw machine 10, the player puts coins into the four coin slots 12 corresponding in position to the first prize space 112, the second prize space 113, the third prize space 114 and the fourth prize space 115. The player can manipulate the first controller 13 to play a game in the first prize space 112/or the second prize space 113, and the player can manipulate the second controller 14 to play a game in the third prize space 114/or the fourth prize space 115. However, each of the four coin slots 12 cooperates with one coin acceptor 19, which increases the cost of production. The arrangement of the four coin slots 12 corresponds to the arrangement of the first prize space 112, the second prize space 113, the third prize space 114 and the fourth prize space 115. If many players want to play games in the respective prize spaces at the same time, it is necessary for the players to carefully identify the positions of the coin slots at the lower section of the housing 11 so that the players can put coins into the correct coin slots 12. It is inconvenient to operate the claw machine, reducing the player's interest in the game. Thus, there is a need to improve the claw machine.

SUMMARY OF THE PRESENT INVENTION

The primary object of the present invention is to solve the aforesaid problems and to provide a multi-player claw machine. The claw machine has a coin slot for players to put coins into the coin slot, and the coin value can be computed. The claw machine has a plurality of prize spaces and controllers each corresponding in position to one of the prize spaces. The controllers each have a joystick. When in use, the player can move the joystick to manipulate a claw unit provided in the corresponding prize space to catch an article (prize). The claw machine may be operated by many players at the same time.

In order to achieve the foregoing object, the present invention provides a multi-player claw machine. The claw machine comprises a housing, a coin slot, a first controller, a second controller, a third controller, a fourth controller, a first claw unit, a second claw unit, a third claw unit, and a fourth claw unit. A plurality of partitions are disposed inside the housing so that the housing is partitioned into a first prize space, a second prize space, a third prize space and a fourth prize space that are arranged side by side on top, bottom, left and right sides of the housing. The first controller is located on a front of the claw machine corresponding in position to the first prize space. The second controller is located on the front of the claw machine corresponding in position to the second prize space. The third controller is located on the front of the claw machine corresponding in position to the third prize space. The fourth controller is located on the front of the claw machine corresponding in position to the fourth prize space. The first controller includes a first joystick and at least one first button. The second controller includes a second joystick and at least one second button. The third controller includes a third joystick and at least one third button. The fourth controller includes a fourth joystick and at least one fourth button. The first claw unit is electrically connected to the first controller. The first joystick is movable to manipulate the first claw unit. The second claw unit is electrically connected to the second controller. The second joystick is movable to manipulate the second claw unit. The third claw unit is electrically connected to the third controller. The third joystick is movable to manipulate the third claw unit. The fourth claw unit is electrically connected to the fourth controller. The fourth joystick is movable to manipulate the fourth claw unit. The coin slot is connected to a coin acceptor. The coin acceptor is able to generate a playable value. The playable value is a value equal to or greater than "0". When any one of the first controller, the second controller, the third controller and the fourth controller is actuated to play a game, the playable value is deducted once. When the playable value is greater than "0", any one of the first joystick, the second joystick, the third joystick and the fourth joystick is selectively moved to start the game. When the playable value is equal to "0", any one of the first joystick, the second joystick, the third joystick and the fourth joystick cannot be moved to start the game.

In one embodiment of the present invention, the coin acceptor is connected to a control device. The control device includes a central processing unit, a receiving unit, and a computing unit. The central processing unit is electrically connected to the receiving unit, the computing unit, the first controller, the second controller, the third controller and the fourth controller respectively. The receiving unit is electrically connected to the coin acceptor. The coin acceptor is able to generate a coin value signal. The receiving unit receives the coin value signal. The central processing unit commands the computing unit to compute the playable value. When the first joystick is moved, the central processing unit enables the first controller to control movement and action of the first claw unit. When the second joystick is moved, the central processing unit enables the second controller to control movement and action of the second claw unit. When the third joystick is moved, the central processing unit enables the third controller to control movement and action of the third claw unit. When the fourth joystick is moved, the central processing unit enables the fourth controller to control movement and action of the fourth claw unit.

In one embodiment of the present invention, the control device further includes a display unit. The central processing unit is electrically connected to the display unit. The display unit is located on the front of the housing. The central processing unit displays the playable value on the display unit.

After putting coins into the coin slot, players can directly manipulate one of the first controller, the second controller, the third controller and the fourth controller to operate the claw machine at the same time or not at the same time, so that the claw machine can be operated by many players.

DETAILED DESCRIPTION OF THE PREFERRED EMBODIMENT

Embodiments of the present invention will now be described, by way of example only, with reference to the accompanying drawings.

Figure 1:
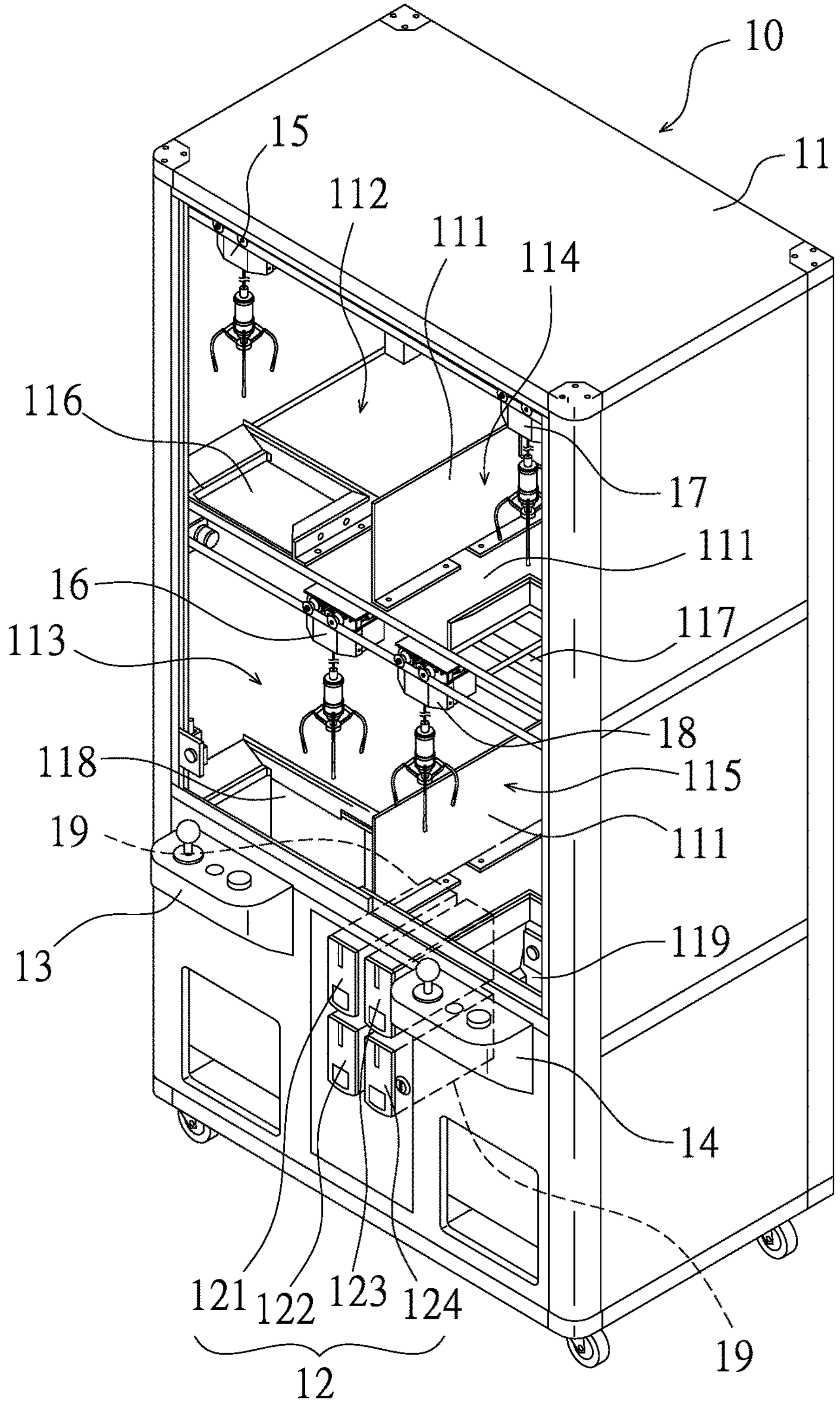
FIG.1 PRIOR ART
FIG. 1 is a perspective view of a conventional claw machine.
Figure 2:
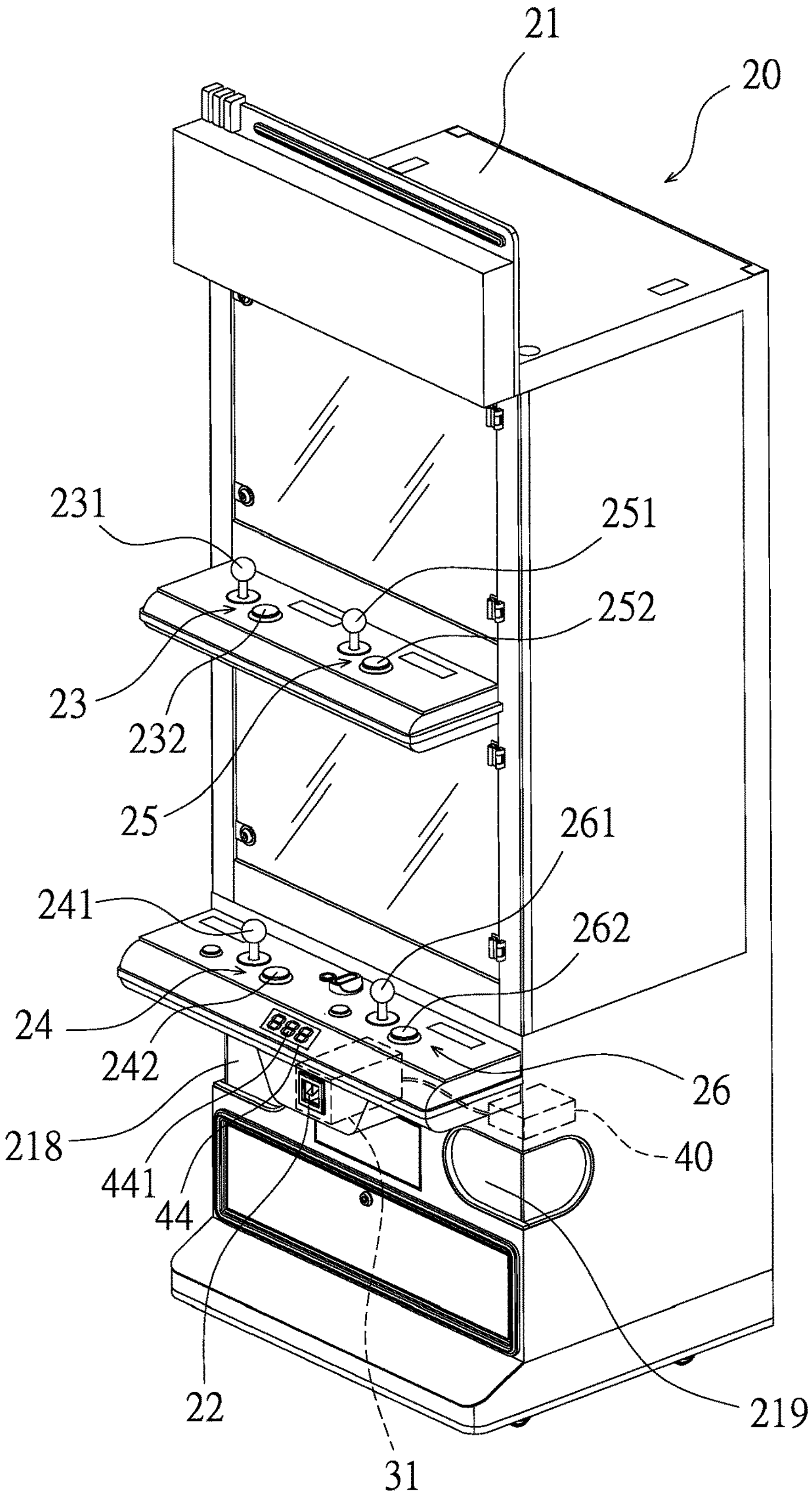
FIG. 2 is a perspective view of the present invention.
Figure 3:
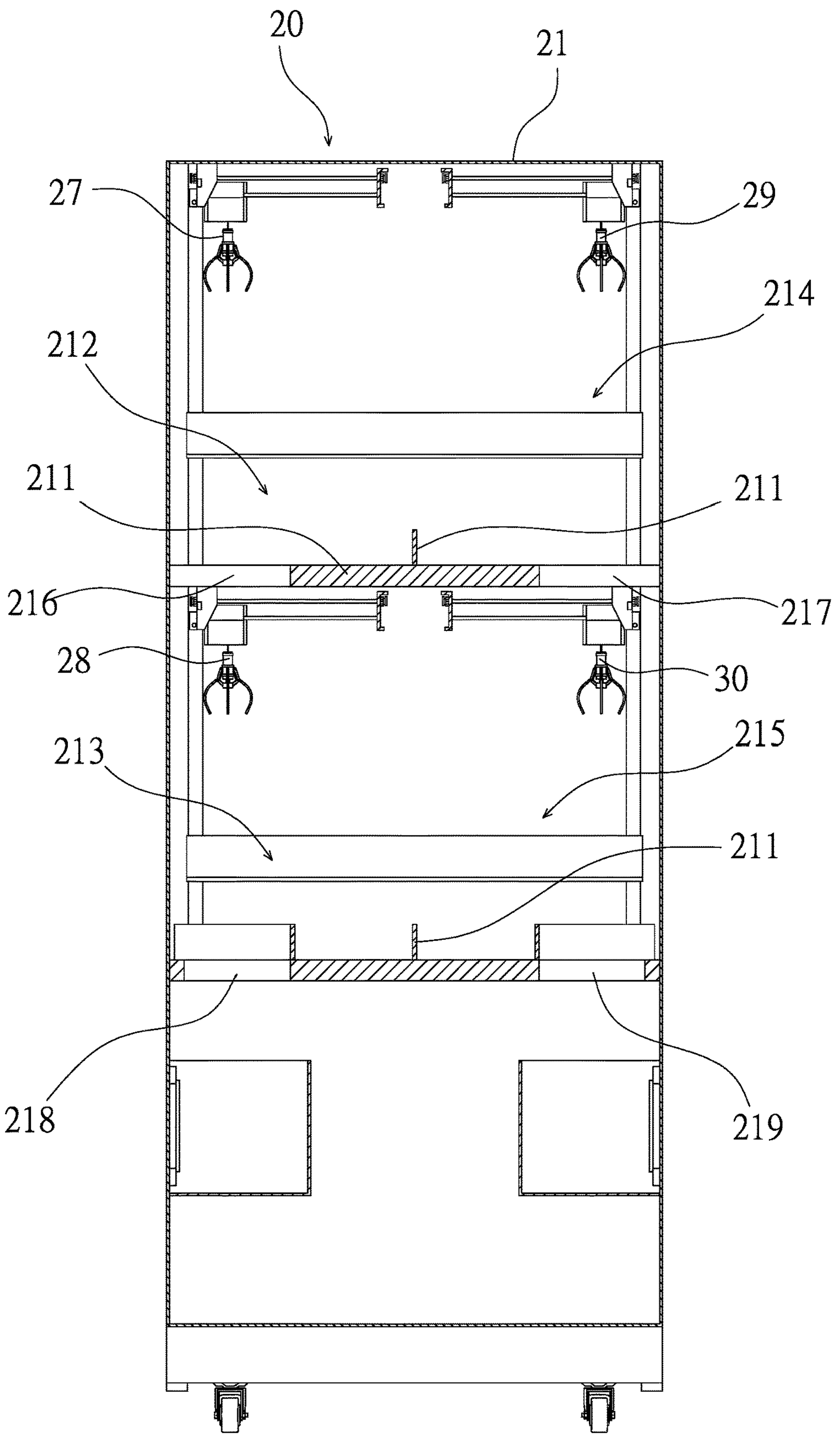
FIG. 3 is a cross-sectional view of the present invention.
Figure 4:
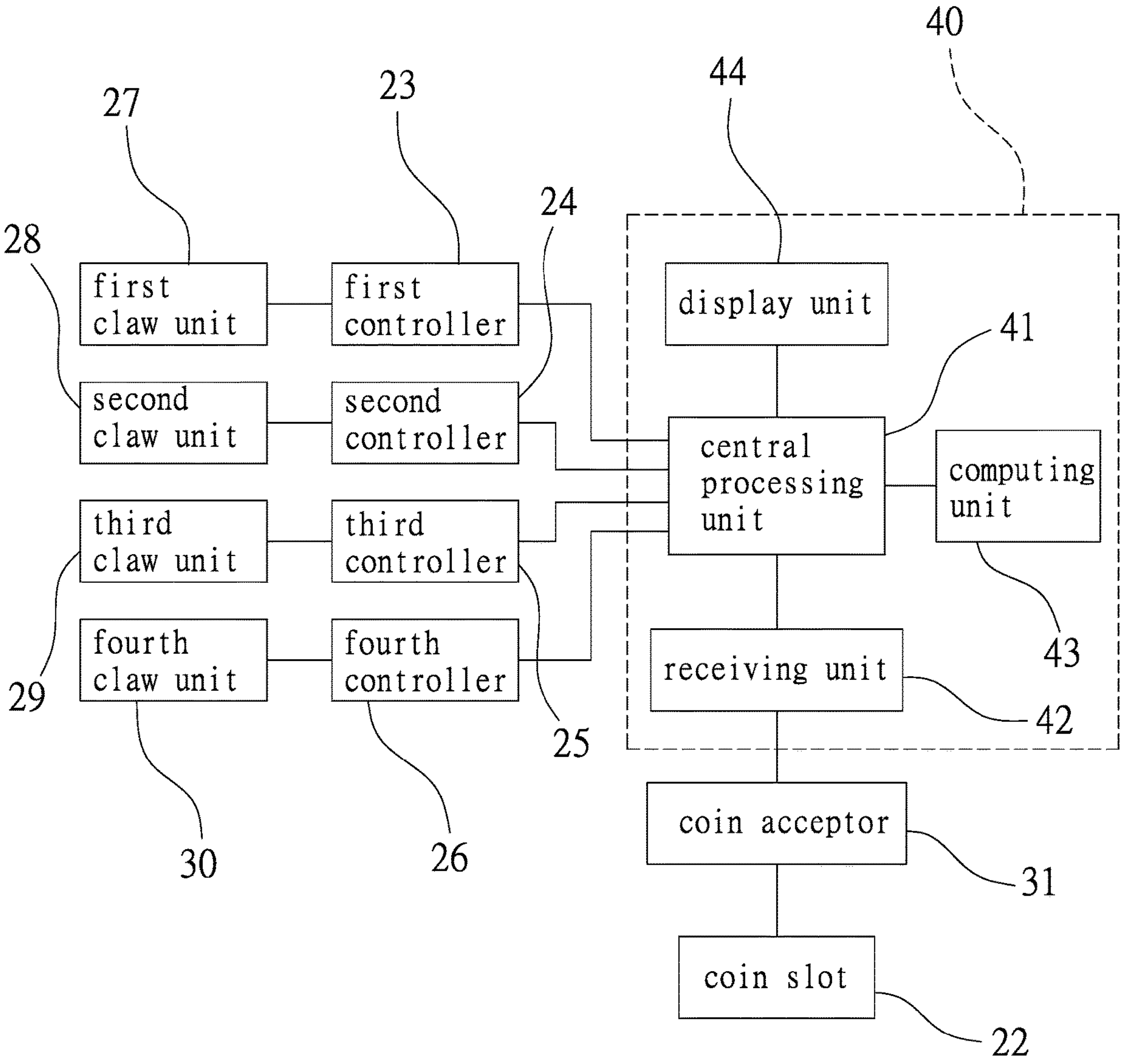
FIG. 4 is a schematic view of the control device of the present invention.

Referring to FIG. 2 through FIG. 4, the present invention discloses a multi-player claw machine 20, which provides a game for players to catch articles (prizes). The claw machine 20 comprises a housing 21, a coin slot 22, a first controller 23, a second controller 24, a third controller 25, a fourth controller 26, a first claw unit 27, a second claw unit 28, a third claw unit 29, a fourth claw unit 30, and a coin acceptor 31. A plurality of partitions 211 are disposed inside the housing 21, so that the housing 21 is partitioned into a first prize space 212, a second prize space 213, a third prize space 214 and a fourth prize space 215 that are arranged side by side on the top, bottom, left and right sides of the housing 21. A first chute 216 is disposed between the first prize space 212 and the second prize space 213, so that the first prize space 212 communicates with the second prize space 213. A second chute 217 is disposed between the third prize space 214 and the fourth prize space 215, so that the third prize space 214 communicates with the fourth prize space 215. The first chute 216 is located directly above a first prize outlet 218. The second chute 217 is located directly above a second prize outlet 219. The first controller 23 is located on the front of the claw machine 20 corresponding in position to the first prize space 212. The second controller 24 is located on the front of the claw machine 20 corresponding in position to the second prize space 213. The third controller 25 is located on the front of the claw machine 20 corresponding in position to the third prize space 214. The fourth controller 26 is located on the front of the claw machine 20 corresponding in position to the fourth prize space 215. The first controller 23 includes a first joystick 231 and at least one first button 232. The second controller 24 includes a second joystick 241 and at least one second button 242. The third controller 25 includes a third joystick 251 and at least one third button 252. The fourth controller 26 includes a fourth joystick 261 and at least one fourth button 262. The coin slot 22 is connected to the coin acceptor 31. The coin acceptor 31 is connected to a control device 40. The control device 40 includes a central processing unit 41, a receiving unit 42, a computing unit 43, and a display unit 44. The central processing unit 41 is electrically connected to the receiving unit 42, the computing unit 43, the display unit 44, the first controller 23, the second controller 24, the third controller 25 and the fourth controller 26 respectively. The receiving unit 42 is electrically connected to the coin acceptor 31. The display unit 44 is located on the front of the housing 21. When the player puts a coin into the coin slot 22, the coin acceptor 31 identifies the coin type and the coin value and generates a coin value signal. The receiving unit 42 receives the coin value signal. The central processing unit 41 commands the computing unit 43 to compute a playable value 441. The playable value 441 is a value equal to or greater than "0". The central processing unit 41 displays the playable value 441 on the display unit 44. The first claw unit 27 is electrically connected to the first controller 23. When the first joystick 231 is moved, the central processing unit 41 enables the first controller 23 to control the movement and action of the first claw unit 27. For example, the first claw unit 27 is controlled to move and catch a prize. If the playable value 441 is equal to “0”, the first controller 23 will not be actuated. The second claw unit 28 is electrically connected to the second controller 24. When the second joystick 241 is moved, the central processing unit 41 enables the second controller 24 to control the movement and action of the second claw unit 28. For example, the second claw unit 28 is controlled to move and catch a prize. If the playable value 441 is equal to “0”, the second controller 24 will not be actuated. The third claw unit 29 is electrically connected to the third controller 25. When the third joystick 251 is moved, the central processing unit 41 enables the third controller 25 to control the movement and action of the third claw unit 29. For example, the third claw unit 29 is controlled to move and catch a prize. If the playable value 441 is equal to “0”, the third controller 25 will not be actuated. The fourth claw unit 30 is electrically connected to the fourth controller 26. When the fourth joystick 261 is moved, the central processing unit 41 enables the fourth controller 26 to control the movement and action of the fourth claw unit 30. For example, the fourth claw unit 30 is controlled to move and catch a prize. If the playable value 441 is equal to “0”, the fourth controller 26 will not be actuated. Players can accumulate the value of coins after putting coins into the coin slot 22 and directly manipulate one of the first controller 23, the second controller 24, the third controller 25 and the fourth controller 26 to operate the claw machine 20 at the same time or not at the same time, so that the claw machine 20 can be operated by many players. The coin slot 22 only needs to be connected to one coin acceptor 31, thereby achieving the substantial benefits of simplifying components and reducing manufacturing costs.

The assembly, function and effect of the above-mentioned embodiment are described in detail below. Referring to FIG. 2 through FIG. 4, for operating the claw machine 20, first, the player has to put coins into the coin slot 22. Regardless of whether a single player or many players play the game together, all coins are put into the same coin slot 22. The players may put more coins at one time, and the total of coins will be calculated. The coin acceptor 31 can identify the coin type and the coin value and generate a coin value signal. The receiving unit 42 receives the coin value signal. The playable value 441 computed by the computing unit 43 is displayed on the display unit 44.

If there is one player and the playable value 441 displayed by the display unit 44 is “1”, for example, the player may choose and manipulate any of the controllers to play the game. For example, if the third controller 25 is selected to be manipulated, the signal of moving the third joystick 251 is transmitted to the central processing unit 41. The central processing unit 41 transmits the signal to the computing unit 43 and changes the playable value 441 to “0” by subtracting it once. The central processing unit 41 allows the third controller 25 to manipulate the third claw unit 29. The player moves the third joystick 251 to control the third claw unit 29 to move in the third prize space 214. By pressing the third button 252, the third claw unit 29 is lowered to catch an article (prize), allowing the player to complete a game. At this time, if the player moves any joystick again, the claw machine 20 cannot be operated because the playable value 441 is “0”. The central processing unit 41 won’t send an actuation signal so that the player is not allowed to operate the claw machine 20.

If there are three players and the playable value 441 displayed on the display unit 44 is “5”, for example, the first player may choose to manipulate any of the controllers to play the game. For example, the first player would like to select the second controller 24 for manipulation, the signal of moving the second joystick 241 is transmitted to the central processing unit 41. The central processing unit 41 transmits the signal to the computing unit 43 and changes the playable value 441 to “4” by subtracting it once. The central processing unit 41 allows the second controller 24 to manipulate the second claw unit 28. The player moves the second joystick 241 to control the second claw unit 28 to move in the second prize space 213. By pressing the second button 242, the second claw unit 28 is lowered to catch an article (prize), allowing the first player to complete a game.

When the first player is playing the game, the second player or the third player can play the game at the same time or not at the same time. At this time, the second or third player can choose to manipulate any available controller to play the game. For example, the second player would like to select the fourth controller 26 for manipulation, the signal of moving the fourth joystick 261 is transmitted to the central processing unit 41. The central processing unit 41 transmits the signal to the computing unit 43 and changes the playable value 441 to “3” by subtracting it once. The central processing unit 41 allows the fourth controller 26 to manipulate the fourth claw unit 30. The player moves the fourth joystick 261 to control the fourth claw unit 30 to move in the fourth prize space 215. By pressing the fourth button 262, the fourth claw unit 30 is lowered to catch an article (prize), allowing the second player to complete a game.

Further, the third player would like to select the first controller 23 for manipulation, the signal of moving the first joystick 231 is transmitted to the central processing unit 41. The central processing unit 41 transmits the signal to the computing unit 43 and changes the playable value 441 to “2” by subtracting it once. The central processing unit 41 allows the first controller 23 to manipulate the first claw unit 27. The player moves the first joystick 231 to control the first claw unit 27 to move in the first prize space 212. By pressing the first button 232, the first claw unit 27 is lowered to catch an article (prize), allowing the third player to complete a game. In the case that the playable value 441 is “2”, any one of the first player, the second player and the third player may choose to manipulate any of the available controllers to play the game. If any player starts the game, the playable value 441 will be deducted once again until the playable value 441 is “0”, and any one of the first player, the second player and the third player cannot continue to play the game.

When there are many players playing the game together, it is easy to put more coins into the same coin slot 22. There is no need for the players to distinguish the positions of the coin slots. The player moves the corresponding controller in front of the selected prize space of the claw machine 20 to play the game by moving its joystick. The claw machine may be operated by many players at the same time. The coin slot 22 only needs to be connected to one coin acceptor 31, such that the first controller 23, the second controller 24, the third controller 25 and the fourth controller 26 of the claw machine 20 can be manipulated by the players at the same time or not at the same time, so as to achieve the benefit of reducing manufacturing costs.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A multi-player claw machine, comprising a housing, a coin slot, a first controller, a second controller, a third controller, a fourth controller, a first claw unit, a second claw unit, a third claw unit, and a fourth claw unit; a plurality of partitions being disposed inside the housing so that the housing is partitioned into a first prize space, a second prize space, a third prize space and a fourth prize space that are arranged side by side on top, bottom, left and right sides of the housing; the first controller being located on a front of the claw machine corresponding in position to the first prize space, the second controller being located on the front of the claw machine corresponding in position to the second prize space, the third controller being located on the front of the claw machine corresponding in position to the third prize space, the fourth controller being located on the front of the claw machine corresponding in position to the fourth prize space; the first controller including a first joystick and at least one first button, the second controller including a second joystick and at least one second button, the third controller including a third joystick and at least one third button, the fourth controller including a fourth joystick and at least one fourth button; the first claw unit being electrically connected to the first controller, the first joystick being movable to manipulate the first claw unit; the second claw unit being electrically connected to the second controller, the second joystick being movable to manipulate the second claw unit; the third claw unit being electrically connected to the third controller, the third joystick being movable to manipulate the third claw unit; the fourth claw unit being electrically connected to the fourth controller, the fourth joystick being movable to manipulate the fourth claw unit; the coin slot being connected to a coin acceptor, the coin acceptor being able to generate a playable value, the playable value being a value equal to or greater than “0”; wherein when any one of the first controller, the second controller, the third controller and the fourth controller is actuated to play a game, the playable value is deducted once; when the playable value is greater than “0”, any one or more of the first joystick, the second joystick, the third joystick and the fourth joystick is directly manipulated at the same time or not at the same time to start the game; when the playable value is equal to “0”, any one of the first joystick, the second joystick, the third joystick and the fourth joystick cannot be moved to start the game.

2. The multi-player claw machine as claimed in claim 1, wherein the coin acceptor is connected to a control device, the control device includes a central processing unit, a receiving unit, and a computing unit; the central processing unit is electrically connected to the receiving unit, the computing unit, the first controller, the second controller, the third controller and the fourth controller respectively; the receiving unit is electrically connected to the coin acceptor; the coin acceptor is able to generate a coin value signal, the receiving unit receives the coin value signal, the central processing unit commands the computing unit to compute the playable value; when the first joystick is moved, the central processing unit enables the first controller to control movement and action of the first claw unit; when the second joystick is moved, the central processing unit enables the second controller to control movement and action of the second claw unit; when the third joystick is moved, the central processing unit enables the third controller to control movement and action of the third claw unit; when the fourth joystick is moved, the central processing unit enables the fourth controller to control movement and action of the fourth claw unit.

3. The multi-player claw machine as claimed in claim 2, wherein the control device further includes a display unit, the central processing unit is electrically connected to the display unit, the display unit is located on the front of the housing, and the central processing unit displays the playable value on the display unit.

* * * * *